(12) United States Patent
Taw et al.

(10) Patent No.: US 6,845,864 B2
(45) Date of Patent: Jan. 25, 2005

(54) VERSATILE CD/DVD TYPE POCKET ASSEMBLY

(75) Inventors: Daisy S. Taw, Temple City, CA (US); Mark R. Mannon, Newport Beach, CA (US); Brian R. McCarthy, Anaheim Hills, CA (US)

(73) Assignee: Avery Dennison Corporation, Pasadena, CA (US)

( * ) Notice: Subject to any disclaimer, the term of this patent is extended or adjusted under 35 U.S.C. 154(b) by 23 days.

(21) Appl. No.: 10/218,392

(22) Filed: Aug. 13, 2002

(65) Prior Publication Data

US 2004/0031709 A1 Feb. 19, 2004

(51) Int. Cl.⁷ .............................................. B65D 85/57
(52) U.S. Cl. ............................... 206/308.1; 206/308.3
(58) Field of Search ........................... 206/308.1, 308.3, 206/309, 311, 312; 281/116, 31, 38, 40, 41; 229/67.1, 67.4, 68.1, 72

(56) References Cited

U.S. PATENT DOCUMENTS

| | | | | |
|---|---|---|---|---|
| 783,365 A | * | 2/1905 | Coleman | 229/72 |
| 3,926,365 A | * | 12/1975 | Sandstrom | 229/72 |
| 4,629,349 A | * | 12/1986 | Pitts | 402/74 |
| 5,417,509 A | * | 5/1995 | Schwartz | 402/79 |
| 5,887,780 A | * | 3/1999 | Popat et al. | 229/69 |
| D411,402 S | * | 6/1999 | Udwin et al. | D6/626 |
| D426,099 S | * | 6/2000 | Udwin et al. | D6/626 |
| D434,262 S | * | 11/2000 | Bergh et al. | D6/626 |
| 6,149,205 A | | 11/2000 | Attia et al. | |
| 6,186,320 B1 | * | 2/2001 | Drew | 206/308.1 |
| D441,591 S | * | 5/2001 | Drew | D6/626 |
| 6,241,086 B1 | * | 6/2001 | Bergh et al. | 206/308.1 |
| 6,267,234 B1 | * | 7/2001 | Bergh et al. | 206/308.1 |
| D463,975 S | * | 10/2002 | Sipinen | D9/339 |

* cited by examiner

*Primary Examiner*—Shian T. Luong
*Assistant Examiner*—E. Payton
(74) *Attorney, Agent, or Firm*—Fulwider Patton Lee & Utecht LLP

(57) ABSTRACT

A dual pocket or envelope for CDs or DVDs is formed of two standard letter size sheets of 8½"×11" or A-4 size paper, which are bonded together around the edges of the sheets and centrally to divide the sheet assembly into two pockets which are substantially square to hold the discs. One of the sheets is die cut to form the upper edge of the pockets, with a closure flap also being formed above each pocket. Each closure flap may be held in the closed position by mechanical interlinking with the pocket, or by exposed pressure sensitive adhesive, which is enabled and exposed by the removal of a release coated slip of paper from one of the two sheets. An index tab may be die cut from said sheets above the open edge of each pocket.

22 Claims, 5 Drawing Sheets

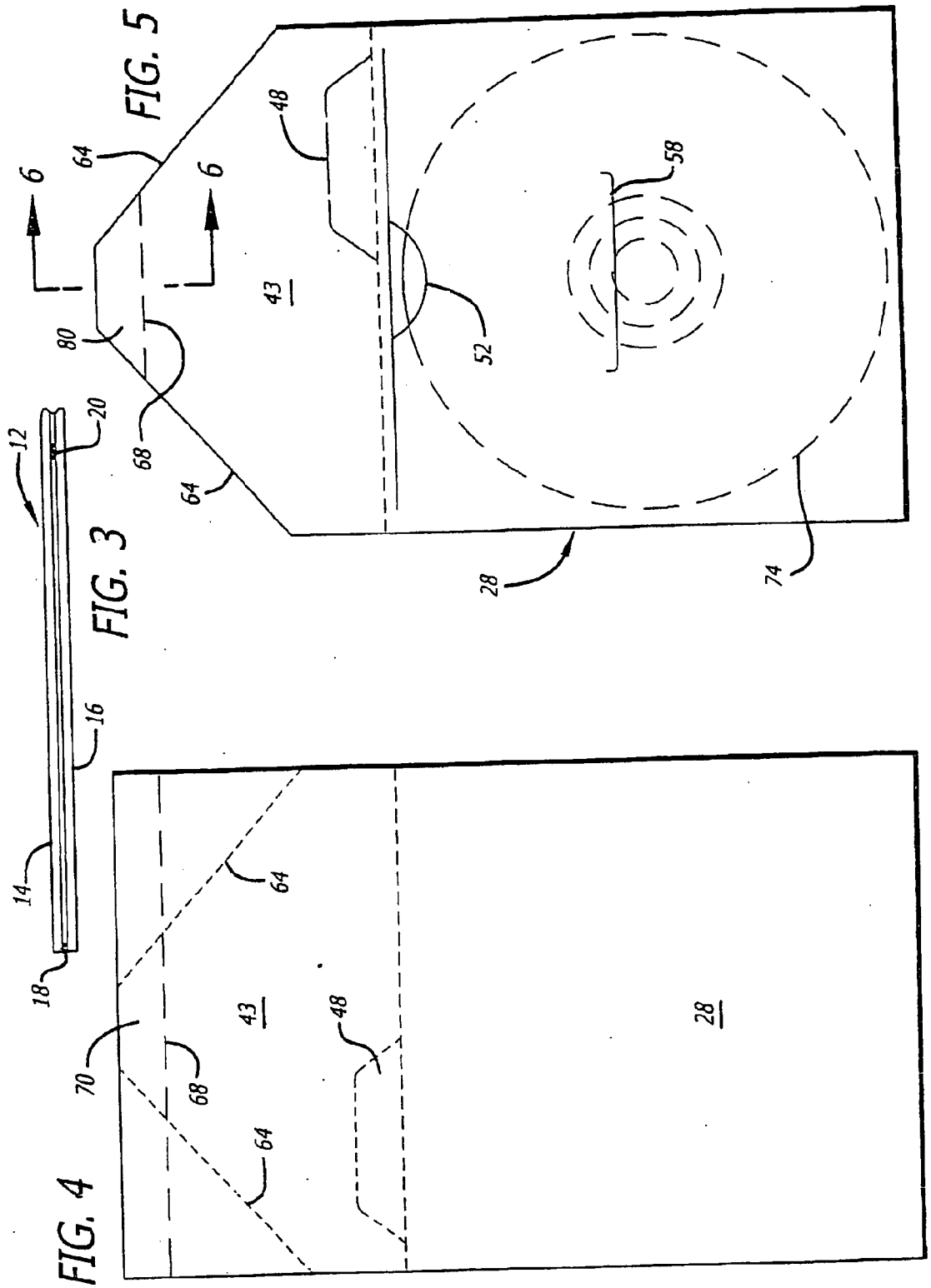

VERSATILE CD/DVD TYPE POCKET ASSEMBLY

FIELD OF THE INVENTION

This invention relates to pockets or envelopes for compact discs (CDs) or digital video discs (DVDs).

SUMMARY OF THE INVENTION

It has previously been proposed to store CDs or DVDs in plastic envelopes or individual paper envelopes. However, the arrangements which have been proposed up to the present time have been unduly expensive or do not readily lend themselves to alternative uses.

Accordingly, principal objects of the present invention involve the provision of inexpensive envelopes or pockets for CDs or DVDs which may be conveniently printed in a laser or ink jet printer and which can be employed for mailing the discs, or for storing them in a file and retrieving them.

In accordance with one illustrative embodiment of the invention, a dual CD or DVD envelope or pocket assembly may include first and second sheets of paper of substantially 8½×11 inch size (including A-4 paper sheets), overlying one another, and being secured together to form two pockets or envelopes. The two sheets are preferably secured together along the two shorter edges of the assembly, along a first one of the longer edges thereof, and along the centers of said sheets to the first edge to divide the assembly into two pockets each being secured closed on three sides of each of the pockets. A first one of said sheets is die cut to form the upper edges of each pocket or envelope to form them into a substantially square configuration to receive a CD or DVD. Further, the assembly is die cut to form a flap for folding down and closing the unsecured side of the pockets. In addition, the assembly is perforated down the center thereof to permit separation of the two pockets.

Additional features or aspects of the invention may include any or all of the following:

1. The first sheet may have a cut-out or recess in the open edge thereof to permit easy removal of the disc.

2. The assembly may be less than 15 mils (0.015)thick or preferably less than 12 mils (0.012 inch) thick to permit easy feeding through printers such as desk top laser or ink jet printers.

3. The first sheet may be provided with a transverse slot for receiving the closure flap.

4. The assembly may provide a die cut index tab for each pocket for use when the discs are stored in a file.

5. The closure flap may be provided with a pressure sensitive adhesive coated area on one sheet, and a release coated, removable strip overlying the coated area, so that the closure flap may be permanently adhered in its closed configuration for mailing or express delivery of the CD or DVD.

6. The assembly in standard letter size format may be printed on one or both sides in a desk top laser or ink jet printer, prior to separation into two pockets or envelopes.

7. A file box or file drawer may be employed to store a plurality of the CD or DVD pockets, with indicia on the index tab identifying the specific disc enclosed in the envelope.

8. The two sheets may be secured together by permanent pressure sensitive adhesive; and the same pressure sensitive adhesive may be employed on the closure flap.

It is also noted that the size of CDs or DVDs, which are about 4⅝ inches in diameter, lend themselves very well to the implementation of the invention in a dual disc mode using two standard letter size sheets, for example 8½×11 inches in size. Thus, the two discs together have a combined extent of 9¼ inches, allowing the additional 1¾ inches in the 11 inch dimension for the adhesive stripes forming the edge closures for the disc pockets. In addition, the residual space on the 8½×11 inch sheets may conveniently be used for the closure flap and for an index tab when the pockets or envelopes are used as files. However, it is noted that the pockets can of course also be formed individually as well as in the preferred dual format.

Other objects, features and advantages of the invention will become apparent from a consideration of the following detailed description and from the accompanying drawings.

BRIEF DESCRIPTION OF THE DRAWINGS

FIG. 3 is a cross-sectional view taken along lines 3—3 of FIG. 2;

FIG. 4 is a front view of one of the envelopes or pockets, after the assembly of FIGS. 1–3 has been separated into two pocket subassemblies;

FIG. 5 is a plan view of the back side of the assembly of FIG. 4, with a compact disc or DVD shown inserted into the pocket;

DETAILED DESCRIPTION OF THE PREFERRED EMBODIMENTS

While the specification describes particular embodiments of the present invention, those of ordinary skill can devise variations of the present invention without departing from the inventive concepts.

Figure 1:
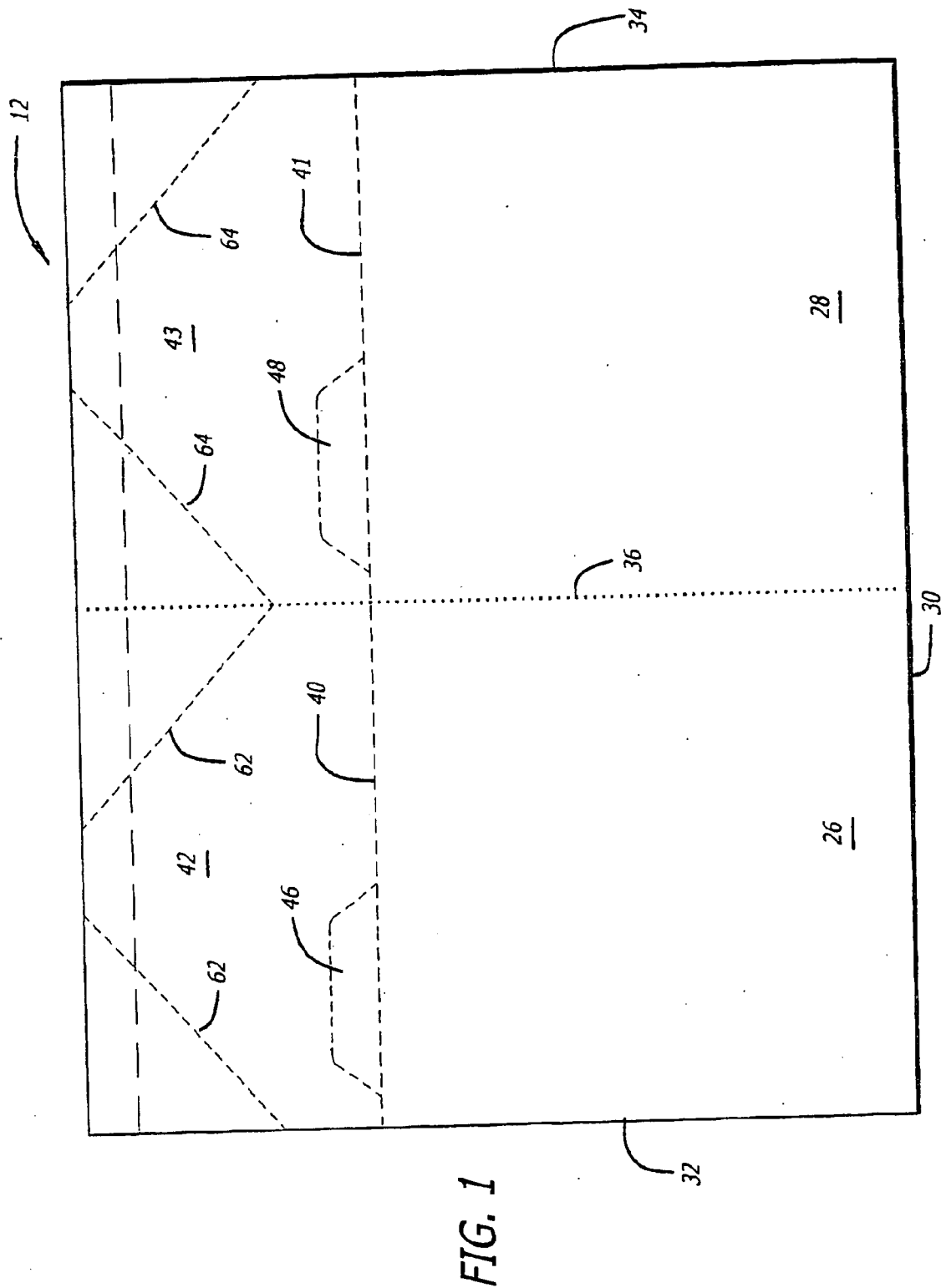
FIG. 1 is front view of a dual CD/DVD pocket or envelope assembly illustrating the principles of the invention.
Figure 2:
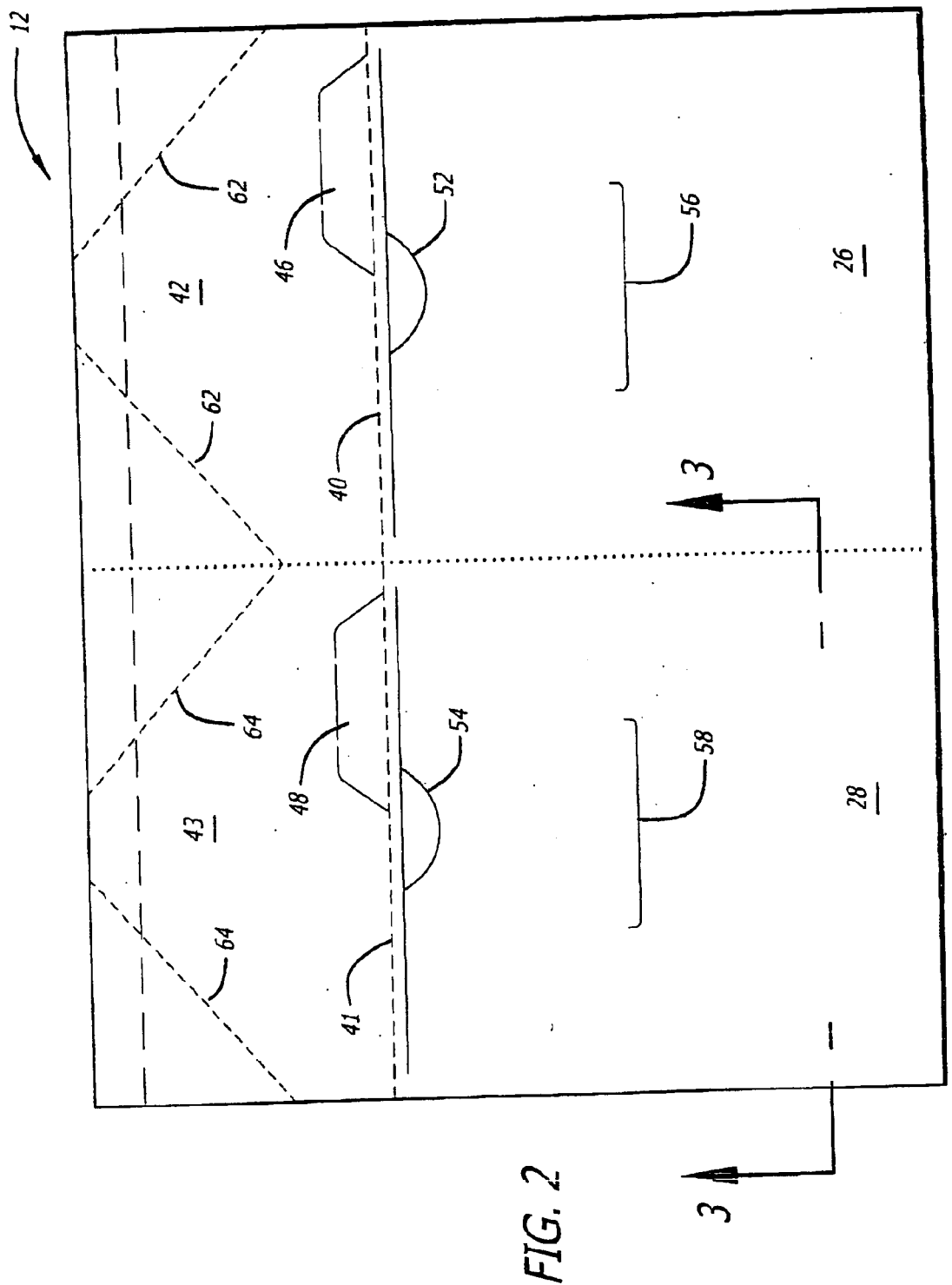
FIG. 2 is a plan view of the back side of the assembly of FIG. 1.

Referring now particularly to FIGS. 1–3 of the drawings, these figures show the front of the assembly in FIG. 1, the back of the assembly in FIG. 2, and a cross-sectional view along lines 3—3 of FIG. 2 is shown in FIG. 3 of the drawings. The assembly 12 of FIGS. 1–3 includes upper and lower sheets 14 and 16 as best shown in FIG. 3 of the drawings; and these are adhered together by permanent adhesive as indicated at reference numerals 18 and 20 shown in FIG. 3. The complete assembly 12 may be formed of standard letter size paper, either 8½×11 inch paper, or A-4 paper, which measures approximately 8¼×11⅝ inches, and these two styles of paper will be referred to in the present specification and claims as being standard letter size paper, or in some cases as being substantially 8 to 9 inches by 11 to 12 inches in size. Two sheets of paper, 14 and 16 may be approximately 5 mils thick with the adhesive layer 18, 20 being approximately 1 mil thick, so that the entire assembly is approximately 11 mils thick. This is sufficiently thin and flexible that the sheets may be readily handled by a desktop printer, despite the curved path the paper must follow. The paper is preferably coated paper sold as being suitable for receiving xerographic or ink jet printing. Regarding the thickness of the assembly, for ease and passing through a desktop or similar copier or printer, the thickness should be less than 15 mils (0.015 inch) thick, and preferably equal to or less than 12 mils (0.012 inch) thick.

Now, referring back to FIG. 1 of the drawings, the assembly includes a first pocket 26 and a second pocket 28. These pockets are sealed along the longitudinal edge 30 of the assembly and along both sides 32 and 34, as well as along the central area 36 of the assembly. Permanent pressure sensitive adhesive such as hot melt adhesive may be employed, and the width of the adhesive along the edges 30, 32 and 34 may be approximately ⅛". Along the line 36, the adhesive stripe may be ¼" wide, providing a ⅛" width adhesive stripe on each pocket, after they are separated by the perforations extending along the central line 36.

In the construction of the assembly of FIGS. 1–3, perforations may be employed with substantial length cuts, and reduced length ties holding the two portions of the sheets of paper together. In addition, lines of weakness are provided for example, along line 40 where the closure flap 42 is bent to close or seal the open upper edge of the pocket 26. A similar line of weakness 42 is provided for pocket 28. To provide lines of weakness, the paper may be merely scored, without perforations, or perforations may be provided with longer ties and shorter cuts. Perforations for separating the paper assembly may be provided along lines 36, 62 and 64 and around index tabs 46 and 48 as shown in FIG. 1, using longer cuts and shorter ties.

Referring now to FIG. 2 of the drawings, it shows the back side of the assembly of FIG. 1, with the pocket 28 is to the left, while the pocket 26 is to the right in FIG. 2. As shown in both FIGS. 1 and 2, index tabs 46 and 48 are provided for use in identifying particular CDs or DVDs when they are in a file assembly. As shown to advantage in FIG. 2 of the drawings, the recesses 52 and 54 are provided in the upper open edges of the pockets for ease in removing the discs which may be stored in the pockets. It is also noted that slots 56 and 58 may be provided in pockets 26 and 28, respectively, in order to receive the closure flaps 42 or 43 when it is desired to close the open side of the pocket or envelope. In both FIGS. 1 and 2, the perforations 62 and 64 are shown, and these are employed for subsequent removal of the triangular corners so that the closure flaps 42 or 43 may be inserted into the slots 56 or 58, or otherwise used as disclosed herein below.

It may be noted in passing that, in the areas of the closure flaps 42 and 43, the upper and lower sheets are bonded together by the permanent adhesive.

FIG. 4 is similar to the right hand side of FIG. 1, but shows the right hand pocket or envelope 28 separated from the left hand pocket 26. Incidentally, the transverse die cut 68 serves to permit separation of the two sheets 14 and 16 in the upper area 70 of the closure flap 43, as discussed in greater detail herein below.

FIG. 5 shows the back side of the envelope 28 and particularly shows a compact disc or DVD 74 mounted within the pocket 28. It may also be noted in FIG. 5 that the triangular pieces previously present have now been removed along lines 64.

Figure 6:
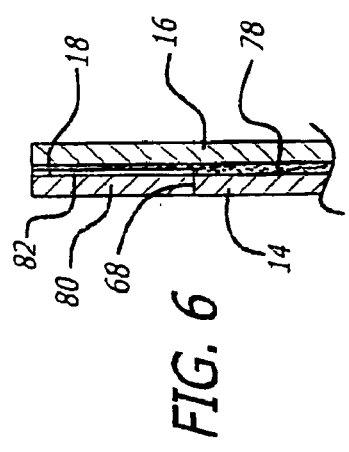
FIG. 6 is a cross-sectional view taken along lines 6—6 of FIG. 5.
Figure 7:
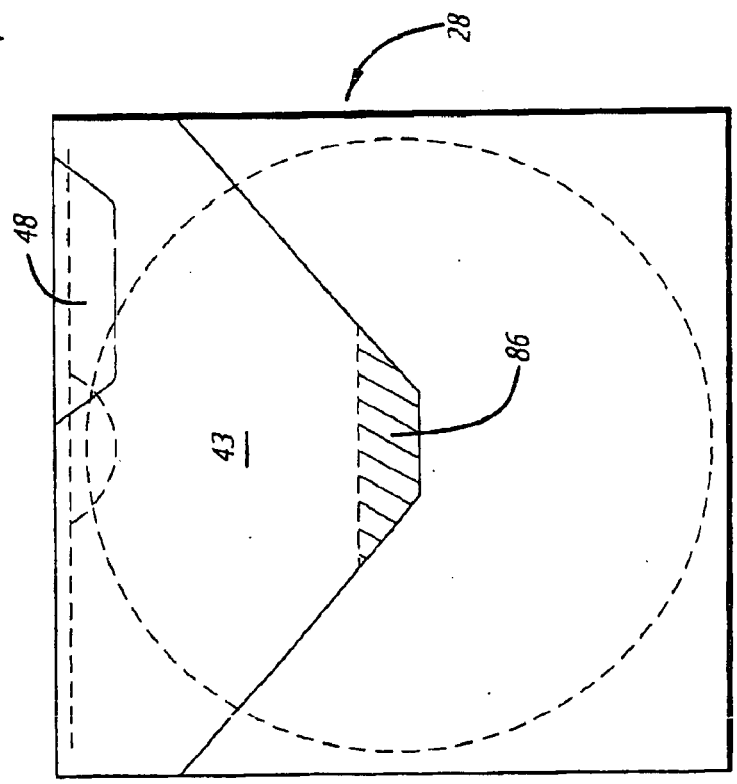
FIG. 7 is another view of the back of the separate assembly with the closure flap folded down and adhesively secured to the back of the pocket or envelope.

FIGS. 5, 6 and 7 will now be considered together. As mentioned above, FIG. 6 is a cross-sectional view taken along lines 6—6 of FIG. 5. In FIG. 6, the upper paper layer 14 and the lower paper layer 16 are bonded together by the adhesive 78. It may be noted that the extreme left hand upper portion of layer 14, which is identified by reference numeral 80, is provided with a die cut 68 which extends only through the upper paper layer 14. In addition, the inner surface of the portion 18 of the closure flap is coated with a very, very thin release layer 82 (perhaps 0.0001 inch thick) which prevents the paper sheet 80 from being firmly secured to the lower sheet 16 by the permanent adhesive 78. Accordingly, when it is desired to permanently secure a closure flap down over the open side of the pocket, as shown in FIG. 7, the protective strip of paper 80 is removed, and the flap is folded down into engagement with the outer surface of the pocket. Incidentally, the dashed lines 86 in FIG. 7 represent the bared adhesive which has been exposed when the protective slip of paper 80 is removed from the closure flap 43. It may also be noted that the index tab 48 may be folded down with the rest of the closure flap, if desired, for example when permanently closing the pocket for mailing.

Figure 8:
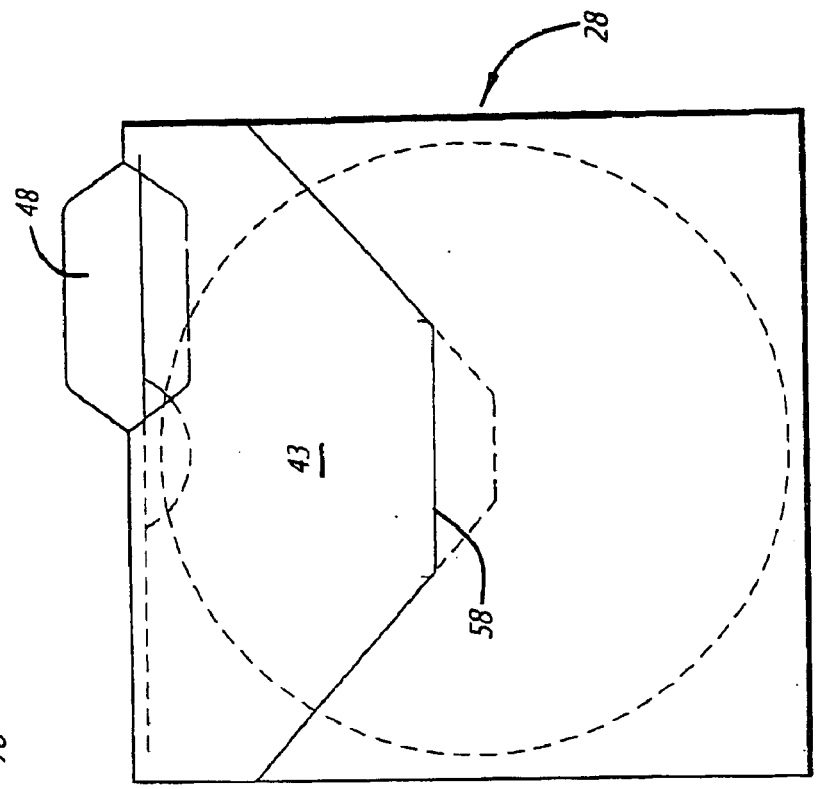
FIG. 8 is a view similar to that of FIG. 7, but with the closure flap inserted into a slot extending transversely across the pocket.

Referring now to FIG. 8 of the drawings, the closure flap 43 has been folded down and is inserted through the slit 56. The index tab 48 may be separated from the closure flap 43 and remains extending upwardly from the assembly, as shown in this FIG. 8.

Figure 9:
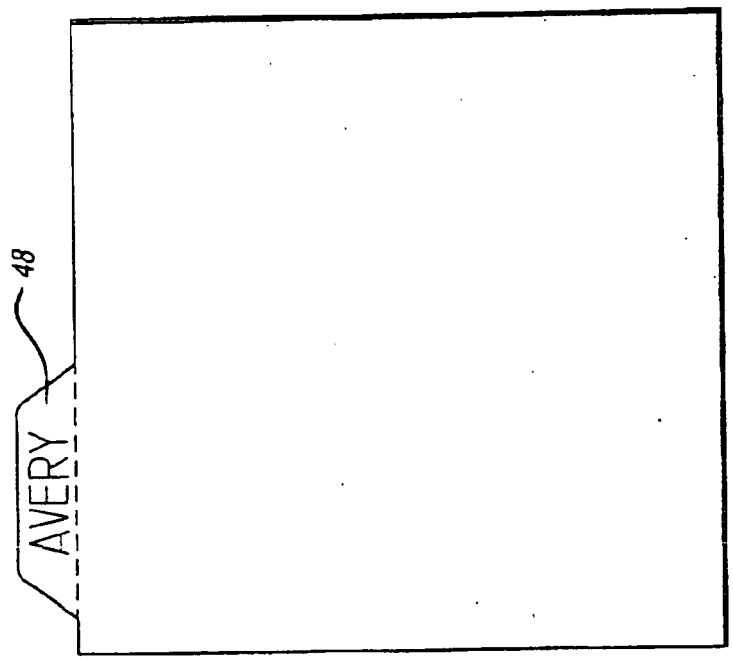
FIG. 9 is a front view of the envelope or pocket of FIG. 8, with the index tab providing information for filing the CD and for retrieving it.

With reference to FIG. 9 of the drawings, it is merely included for completeness to show the front side of the assembly which could of course be imprinted with any desired information.

Figure 10:
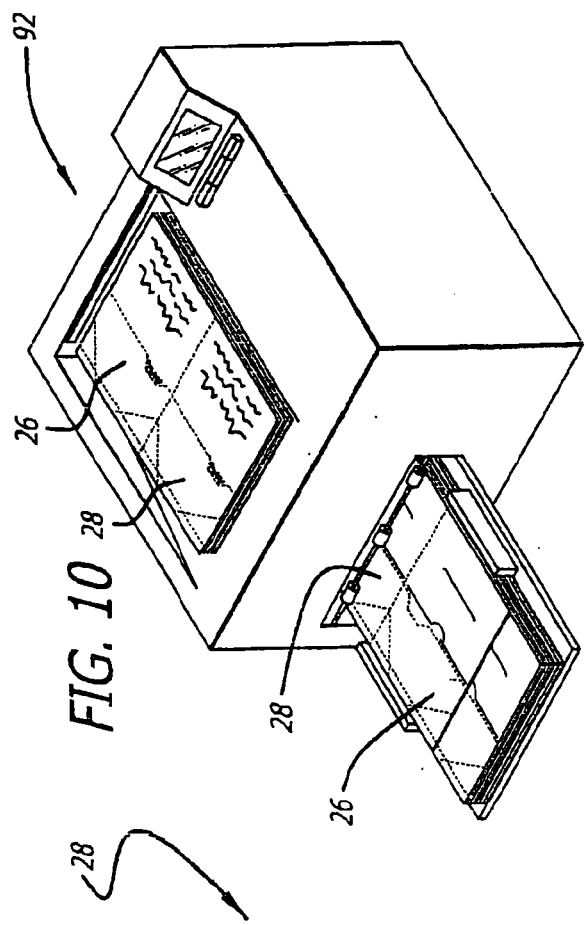
FIG. 10 indicates schematically the printing of the assembly in a desktop printer.

Referring now to FIG. 10 of the drawings, a conventional desktop printer 92 is shown, with the standard letter size sheet assembly of FIGS. 1 and 2 being fed into the printer for the application of appropriate information. Of course, if desired, printing may be applied to both sides of the sheet 26, 28. As mentioned above, the thickness of the two sheet assembly should be less than 15 mils (0.015 inch), or preferably less than 12 mils (0.015 inch) so that easy, smooth feeding through the printer will occur.

Figure 11:
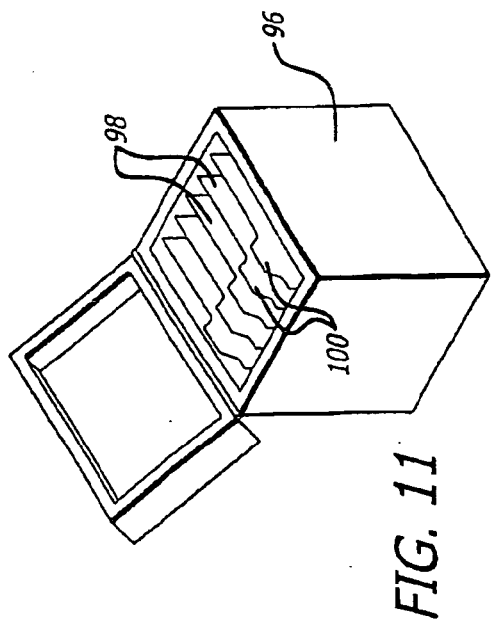
FIG. 11 shows a file box containing a number of the CD pockets with upwardly extending file tabs on the individual pockets.

FIG. 11 of the drawings shows a file cabinet or file box 96, with a plurality of CD or DVD pockets 98 mounted therein. The index tabs 100, on each pocket, serve to identify the particular CD or DVD which is enclosed in the envelope.

In conclusion, in the foregoing detailed description, specific embodiments of the invention have been disclosed. Various modifications and alternative constructions may be employed to implement the invention without departing from the spirit and scope thereof. By way of example and not of limitations, the closure flap may be provided with a removable slip to permit permanent sealing of the envelope; and optionally, this removable slip may be left in place on the closure flap and the flap inserted into the slot in the face of the pocket or envelope, so that the pocket may be temporarily closed, and subsequently if desired, may be permanently sealed. While the present invention is particularly suited for use with standard letter size paper such as 8½"×11" sheets or A-4 sheets, it may be employed with other size paper sheets. Instead of using standard letter size sheets, for example 8½"×11" sheets, double size sheets measuring 17"×11" may be employed with a double size sheet being folded once to provide the 8½"×11" size assembly. Preferably, the same type of hot melt adhesive is employed both on the closure flap and around the edges of each pocket of the assembly; but if desired, a releasable pressure sensitive adhesive may be provided at the tip of the closure flap so that the closure flap may be opened and closed using this releasable pressure sensitive adhesive on the outer tip thereof. Concerning the index tabs, they may be staggered for ease in searching for desired pockets or envelopes. For certain applications, the closure flaps would not be provided with the construction involving the removable slip 80 of FIG. 6 and the permanent closure possibility, but would only be mechanically secured to the pockets. Also, instead of the slits 56, 58, the closure flaps and pockets may be provided with other mechanical arrangements for holding the closure flap closed, such as a vertical slot on the pocket, and a hook configuration on the closure flap. Further, the present construction may be employed to hold other products in addition to or instead of CDs and DVDs. Accordingly, the present invention is not limited to the precise embodiments shown and described hereinabove.

What is claimed is:

1. A dual envelope assembly for CDs or DVDs or the like comprising:

first and second sheets overlying one-another, each of said sheets being standard letter size paper, substantially 8 to 9 inches by 11 to 12 inches, in size;

said sheets being secured together along the shorter edges thereof, along a first one of the longer edges thereof, and from the center of said first one of said longer edges to center of the other of said longer edges; to divide said assembly into two pockets each being secured closed on three sides of each of said pockets;

the thickness of said assembly being less than 0.015 inch thick for ease in printing in a laser printer or ink jet printer;

the first one of said sheets being die cut to form the upper edges of each of said pockets, to form said pockets into a substantially square configuration to receive a CD or DVD disc;

the first of said sheets having a recess die cut into said upper edge centrally with respect to each of said pockets, to permit easy withdrawal of the contents thereof;

the first of said sheets also being die cut parallel to said upper edge, centrally on each pocket, to form a flap receiving slot;

said sheets being die cut to form closure flaps for insertion into said flap receiving slots to close each of said pockets;

said sheets being further die cut to form an index tab for identifying the contents of each pocket; and said assembly being centrally perforated to permit separation of said two pockets.

2. An assembly as defined in claim 1 wherein said pockets have an outer surface, and wherein said closure flaps are formed of two sheets with pressure sensitive adhesive between said sheets; one of said sheets being die cut to form a removable tab on each closure flap; and each said tab having a release coating thereon on the surface facing said pressure sensitive adhesive, whereby said tab may be removed and said closure flap may be folded over the opening of each pocket and adhered to the outer surface of each pocket.

3. An assembly as defined in claim 1 wherein each closure flap has a base adjacent a pocket and wherein a line of weakness is provided at the base of each closure flap for facilitating bending said closure flap into the pocket closing configuration.

4. An assembly as defined in claim 1 wherein the thickness of said assembly is equal to or less than 0.012 inch.

5. An assembly as defined in claim 1 further comprising printed ink indicia on said assembly.

6. An assembly as defined in claim 1 wherein said sheets forming said pockets are secured together around three edges of said pockets with permanent adhesive.

7. A method including the steps of:

forming an assembly as defined in claim 1, printing on said assembly;

separating the two pockets;

putting disks into said two pockets;

folding said closure flaps down to close each of said pocket; and placing said pockets with the disks in the pockets, into a file container, with said index tabs extending upward to identify the contents of each pocket.

8. A dual envelope assembly for CDs or DVDs or the like comprising:

first and second sheets overlying one-another, each of said sheets being standard letter size paper, substantially 8 to 9 inches by 11 to 12 inches, in size;

said sheets being secured together along the shorter edges thereof, along a first one of the longer edges thereof, and along the centers of said sheets o said first edge to divide said assembly into two pockets each being secured closed on ee aides of each of said pockets;

the thickness of said assembly being less than 0.015 inch thick for ease in printing in a laser printer or ink jet printer;

the first one of said sheets being die cut to form the upper edges of each of said pockets, to form said pockets into a configuration to receive a CD o DVD disc;

said sheets having closure flaps for folding over said upper edges to close each of said pockets; and said assembly being centrally perforated to permit separation of said two pockets.

9. A method including the steps of:

forming an assembly as defined in claim 8, printing on said assembly;

separating the two pockets;

putting disks into said two pockets; and folding said closure flaps down to close each of said pockets.

10. A method as defined in claim 9 further including the steps of forming an index tab from each said assembly, and placing said pockets with the disks in the pockets, into a file container.

11. An assembly as defined in claim 8 wherein said pockets have an outer surface, and wherein said closure flaps are formed of two sheets with pressure sensitive adhesive between said sheets; one of said sheets begin die cut to form a removable tab on each closure flap; each said tab having a release coating thereon on the surface facing said pressure sensitive adhesive, whereby said tab may b removed and said closure flap may be folded over the opening of each pocket and adhered to the outer surface of each pocket.

12. An assembly as defined in claim 8 wherein each closure flap has a base adjacent a pocket and wherein a line of weakness is provided at the base of said closure flap for facilitating bending said closure flap into the pocket closing configuration.

13. An assembly as defined in claim 8 wherein the thickness of said assembly is equal to or less than 0.012 inch.

14. An assembly as defined in claim 8 further comprising printed ink indicia on said assembly.

15. An envelope assembly for CDS or DVDs or the like comprising:
    first and second sheets overlying one-another;
    said sheets being secured together along three edges of said sheets;
    the thickness of said assembly being less than 0.015 inch thick for ease i printing in a laser printer or ink jet printer;
    the first one of said sheets being die cut to form the upper edges of each of said pockets, to form said pockets into a substantially square configuration to receive a CD or DVD disc;
    the first of said sheets having a recess die cut into said upper edge centrally with respect to each of said pockets, to permit easy withdrawal of the contents thereof;
    the first of said sheets also being die cut parallel to said upper edge, centrally on said pocket, to form a flap receiving slot;
    said sheets being die cut to form a closure flap for insertion into said flap receiving slot to close said pocket; and
    said sheet being further die cut to form an index tab for identifying the contents of said pocket.

16. An assembly as defined in claim 15 wherein said pockets have an outer surface, and wherein said closure flap is formed of two sheets with pressure sensitive adhesive between said sheets; one of said sheets begin die cut to form a removable tab on said closure flap; said tab having a release coating thereon on the surface facing said pressure sensitive adhesive, whereby said tab may be removed and said closure flap may be folded over the opening of said pocket and adhered to the outer surface of said pocket.

17. An assembly as defined in claim 15 wherein each closure flap has a base adjacent a pocket and wherein a line of weakness is provided at the base of said closure flap for facilitating bending said closure flap into the pocket closing configuration.

18. An assembly as defined in claim 15 wherein the thickness of said assembly is equal to or less than 0.012 inch.

19. An assembly as defined in claim 15 further comprising printed ink indicia on said assembly.

20. An assembly as defined in claim 15 wherein said sheets forming said pocket are secured together around three edges of said pocket with permanent adhesive.

21. An assembly as defined in claim 15 wherein said assembly is formed of two sheets which are substantially equal in size to standard letter size sheets of paper.

22. A pocket assembly for CDs or DVDs or the like comprising:
    first and second sheets overlying one-another;
    said sheets being secured together along three edges of said sheets;
    the thickness of said assembly being less than 0.015 inch thick;
    the first one of said sheets being die cut to form the upper edges of each of said pockets, to form said pockets into a configuration to receive a CD or DVD disc;
    the first of said sheets having a recess die cut into said upper edge centrally with respect to each of said pockets, to permit easy withdrawal of the contents thereof;
    said sheet being die cut to form a closure flap to close said pocket;
    said closure flap mechanically mating with said pocket to electively hold said pocket closed; and
    said sheets being further die cut to form an index tab for identifying the contents of said pocket.

* * * * *